United States Patent
Popovich et al.

(10) Patent No.: US 11,960,510 B2
(45) Date of Patent: Apr. 16, 2024

(54) DATA MOVEMENT FROM DATA STORAGE CLUSTERS

(71) Applicant: Dell Products, L.P., Round Rock, TX (US)

(72) Inventors: Evgeny Popovich, Port Coquitlam (CA); Austin Voecks, Bainbridge, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 32 days.

(21) Appl. No.: 17/659,738

(22) Filed: Apr. 19, 2022

(65) Prior Publication Data
US 2023/0334066 A1  Oct. 19, 2023

(51) Int. Cl.
G06F 7/00 (2006.01)
G06F 16/28 (2019.01)

(52) U.S. Cl.
CPC .................. G06F 16/285 (2019.01)

(58) Field of Classification Search
CPC .................................. G06F 16/285
USPC .................................. 707/600–899
See application file for complete search history.

(56) References Cited

U.S. PATENT DOCUMENTS 8,429,369 B2 * 4/2013 Ogihara ............ G06F 11/2061
711/170
2022/0179790 A1 6/2022 Ellerby et al.

* cited by examiner

Primary Examiner — Isaac M Woo
(74) Attorney, Agent, or Firm — Amin, Turocy & Watson, LLP

(57) ABSTRACT

The described technology is generally directed towards data movement from data storage clusters. A data movement job can be split into data movement tasks, and the data movement tasks can be distributed among multiple nodes of a data storage cluster. In order to distribute the tasks, a data store that identifies the tasks can be split into multiple segments, and different groups of nodes can be assigned affinities to process tasks identified in the different segments. Furthermore, the nodes of each group of nodes can be assigned different start positions within their storage segment, to reduce the likelihood of contention between nodes in connection with claiming a same task. Some of the tasks can be generated in an already claimed state, which also reduces contention and allows for more efficient operation.

20 Claims, 10 Drawing Sheets

DATA MOVEMENT FROM DATA STORAGE CLUSTERS

TECHNICAL FIELD

The subject application generally relates to computing clusters, and, for example, to data movement techniques for moving data from a computing cluster to a target location, and related embodiments.

BACKGROUND

A computing cluster is a group of connected computers that work together such that they can be viewed as a single system in many respects. Computing clusters generally comprise multiple cluster servers, also referred to as nodes, which are controlled and scheduled by software. The nodes can be configured with the same capabilities, and in the event of a failed node, another node can take over tasks of the failed node.

Computing clusters can store large amounts of data, and occasionally, a need arises to move a large amount data from a computing cluster to some other target location. The other target location can be, e.g., another computing cluster, a network file sharing (NFS) server, a cloud object store, or any of a variety of other locations. The data to be moved can comprise, e.g., up to billions of files or directories, or more. In order to conduct such a large data movement operation, the multiple nodes of the computing cluster should cooperate efficiently.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
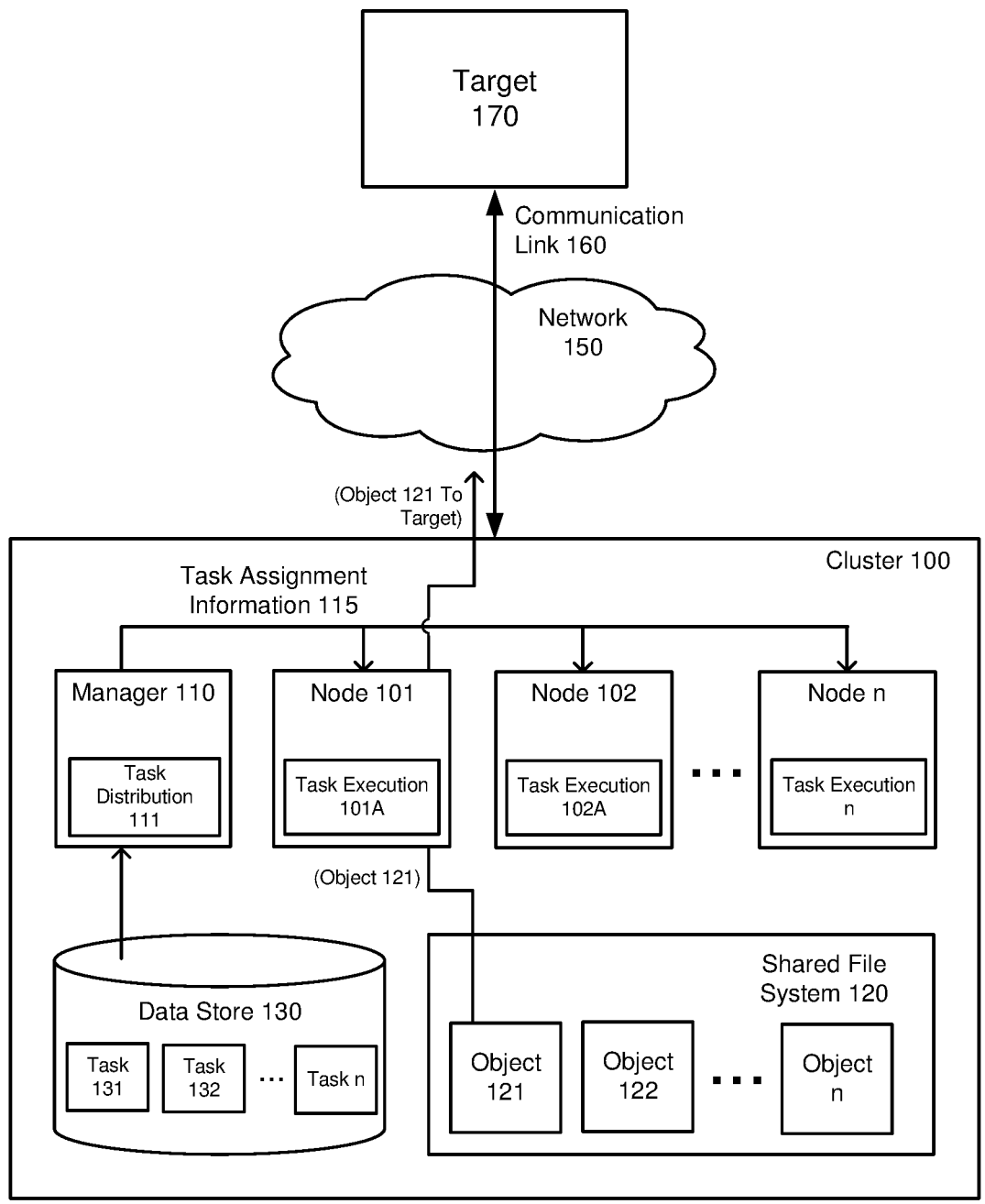
FIG. 1 illustrates an example cluster comprising multiple nodes, wherein the cluster is configured to distribute data movement tasks among the multiple nodes, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to data movement from data storage clusters. A data movement job can be split into data movement tasks, and the data movement tasks can be distributed among multiple nodes of a data storage cluster. In order to distribute the tasks, a data store that identifies the tasks can be split into multiple segments, and different groups of nodes can be assigned affinities to process tasks identified in the different segments. Furthermore, the nodes of each group of nodes can be assigned different start positions within their storage segment, to reduce the likelihood of contention between nodes in connection with claiming a same task. Some of the tasks can be generated in an already claimed state, which also reduces contention and allows for more efficient operation. Further aspects and embodiments of this disclosure are described in detail below.

FIG. 1 illustrates an example cluster comprising multiple nodes, wherein the cluster is configured to distribute data movement tasks among the multiple nodes, in accordance with one or more embodiments described herein. FIG. 1 includes a cluster 100, a network 150, and a target 170. The cluster 100 comprises nodes 101, 102, . . . n, a manager 110, a shared file system 120, and a data store 130. The shared file system 120 comprises objects 121, 122, . . . n. The data store 130 comprises tasks 131, 132, . . . n. the manager 110 comprises task distribution 111. Each respective node 101, 102, . . . n comprises a respective task execution block 101A, 102A . . . n.

In an example according to FIG. 1, the desired outcome is a movement of data, such as the objects 121, 122, . . . n, from the shared file system 120 to a target such as target 170. The movement of, e.g., objects 121, 122, . . . n to the target 170 can be referred to as a job, and the job can be divided into portions referred to herein as tasks. Each task can include, e.g., movement of an object of objects 121, 122, . . . n. Each of the nodes 101, 102, . . . n can participate in the job by handling tasks. The tasks can include, e.g., the tasks 131, 132, . . . n in the data store 130.

The task distribution 111 can provide task assignment information 115 to the nodes 101, 102, . . . n in order to assign the different tasks 131, 132, . . . n to the different nodes 101, 102, . . . n. The respective task execution blocks 101A, 102A . . . n can handle tasks assigned to respective nodes 101, 102, . . . n. For example, task 131 can comprise moving object 121 to the target 170. The task distribution 111 can configure task assignment information 115 to assign task 131 to node 101. In response to receiving the assignment of task 131, the node 101 can process the movement of object 121 to the target 170. For example, the node 101 can send object 121 via communication link 160 to the target 170, wherein the communication link 160 is enabled, in part, by the cluster 100 and the network 150.

In an example embodiment, the shared file system 120, the data store 130, and the manager 110 can be configured as virtual or logical components that are enabled by the nodes 101, 102, . . . n. The shared file system 120, the data store 130, and the manager 110 are nonetheless illustrated as separate from the nodes 101, 102, . . . n in FIG. 1 for simplicity of illustration. For example, in some embodiments, the data store 130 can be implemented as a key value store (KVS) that is implemented across multiple nodes 101, 102, . . . n. The manager 110 can comprise management functions that are distributed across multiple nodes 101, 102, . . . n, and the shared file system 120 can also be supported by multiple nodes 101, 102, . . . n.

In an aspect, solutions according to this disclosure can enable data movement between a clustered file system 120, in which multiple nodes 101, 102, . . . n use a single shared file system 120, and a target 170 which can comprise any other data store, e.g., another clustered file system, or a Linux NFS server, or a cloud object store. The act of moving a dataset, e.g. a set of directories or files such as objects 121, 122, . . . n between two systems is called a job. Datasets can be as large as, e.g., billions of files/directories, and a job can be divided into smaller chunks of work called tasks. Individual tasks such as moving files, directories, or other items can then be executed on the nodes 101, 102, . . . n in the cluster 100. The nodes 101, 102, . . . n can optionally be configured as peers for the processing of tasks 131, 132, . . . n.

One problem encountered in solutions according to FIG. 1 is how to efficiently distribute the tasks 131, 132, . . . n between the nodes 101, 102, . . . n. Any number of constraints may be applicable and may need to be accounted for. Example constraints include: The nodes 101, 102, . . . n can share a database implemented as key-value stores (KVSs). The nodes 101, 102, . . . n cannot use local databases/KVSs for fault tolerance reasons. The nodes 101, 102, . . . n can fail and be replaced at any moment in time. Each KVS access, such as each entry create, read, or write, can require internal KVS locks, resulting in cross-node contention if nodes 101, 102, . . . n concurrently access a same KVS entry or neighboring KVS entries. During a job execution, the nodes 101, 102, . . . n can generate more tasks 131, 132, . . . n, pick up a next set of tasks 131, 132, . . . n for execution, and modify in-progress tasks 131, 132, . . . n. There may be no communication between nodes 101, 102, . . . n other than the shared database/data store 130 (this is an example design decision to simplify implementation). Adding/removing cluster nodes 101, 102, . . . n should not affect the ability of the cluster 100 to produce or consume tasks 131, 132, . . . n. The order of magnitude can be up to billions of tasks 131, 132, . . . n, or more, and up to hundreds of nodes 101, 102, . . . n or more. Providing consistent writes and locks between nodes 101, 102, . . . n in a cluster 100 can be computationally expensive.

Using consistent distributed storage as the backend data store 130 for KVSs can imply that implementations do not necessarily have to address data corruption problems, because the data store 130 itself can provide internal locking. However, there is a desire to exercise locks as little as possible in order to improve performance. More time waiting for locks can reduce KVS operation throughput, and therefore the KVS user's performance (i.e., performance of the nodes 101, 102, . . . n) as well.

Beyond locking for consistency purposes, there can also be locking and communication which can be required between nodes 101, 102, . . . n as part of the distributed storage that implements data store 130 and/or file system 120. Solutions described herein can minimize cross-node 101, 102, . . . n storage communication and lock negotiation for a KVS that implements the data store 130. In addition, usage of the KVS can partition task key space between nodes 101, 102, . . . n in a manner that can reduce the chance of contention between nodes 101, 102, . . . n. Solutions can furthermore reduce or minimize modifications to, and deletes of, existing data.

Figure 2:
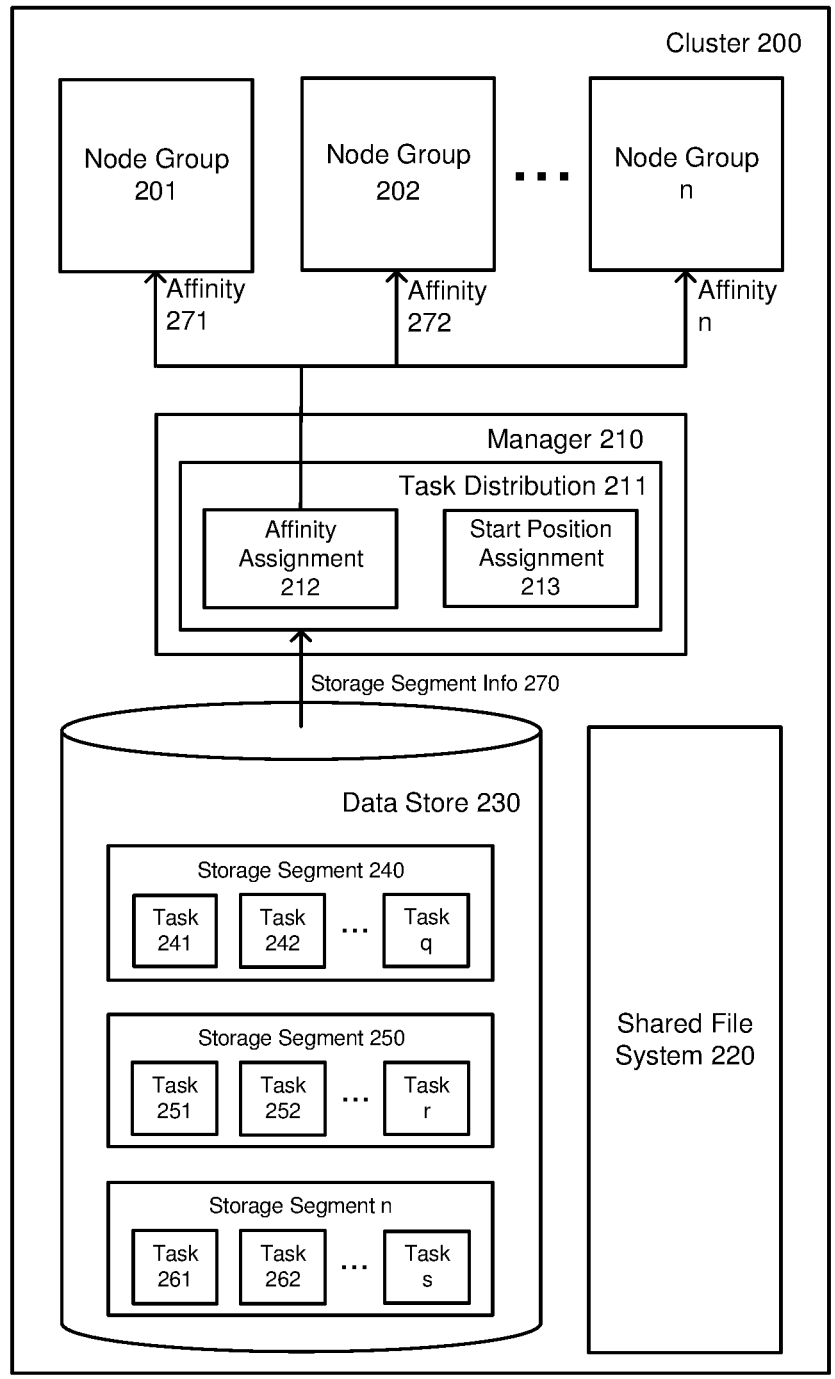
FIG. 2 illustrates example assignment of different affinities to different node groups of a cluster, wherein the different affinities comprise affinities to process data movement tasks of different storage segments, in accordance with one or more embodiments described herein.
Figure 3:
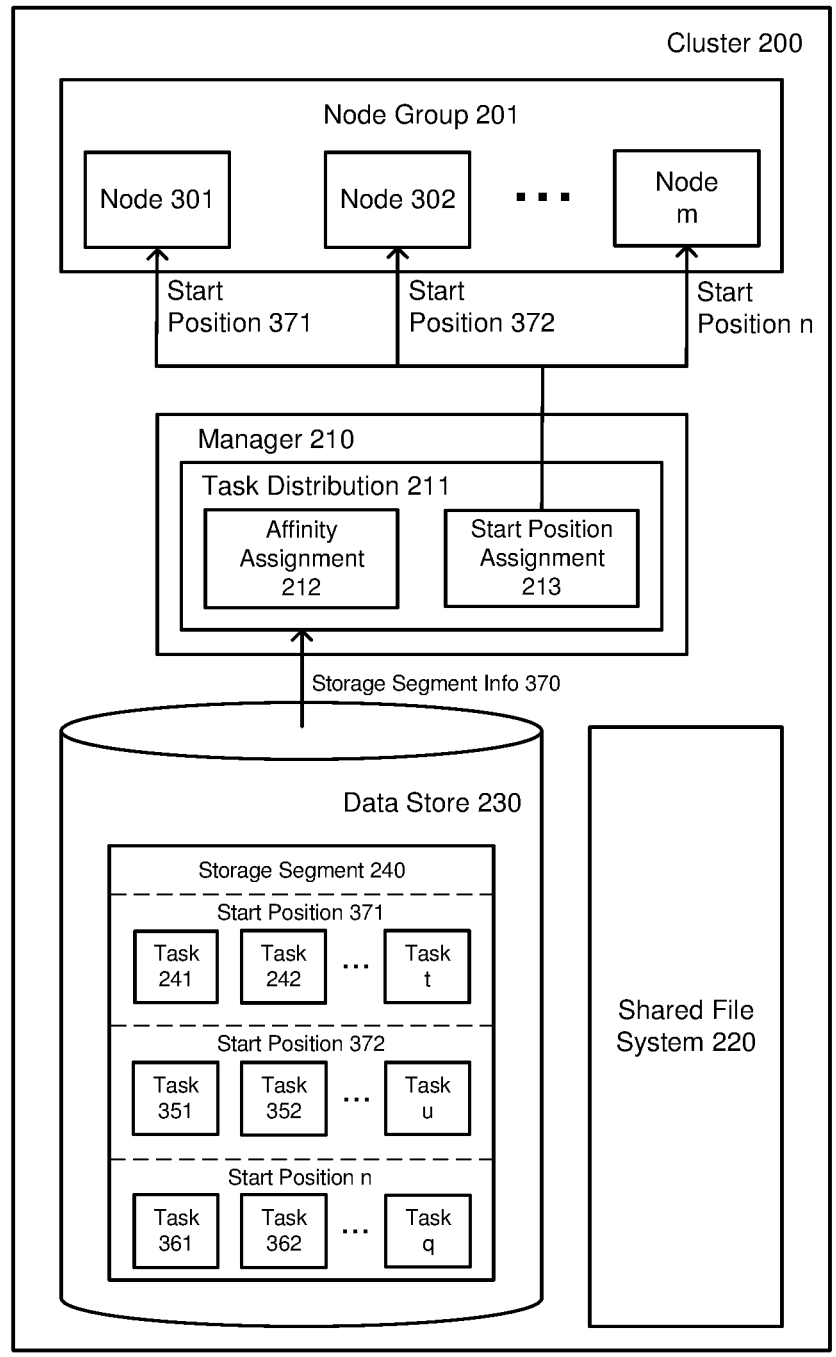
FIG. 3 illustrates example assignment of different start positions to different nodes in a node group, wherein the different start positions comprise different start positions within a storage segment, in accordance with one or more embodiments described herein.
Figure 4:
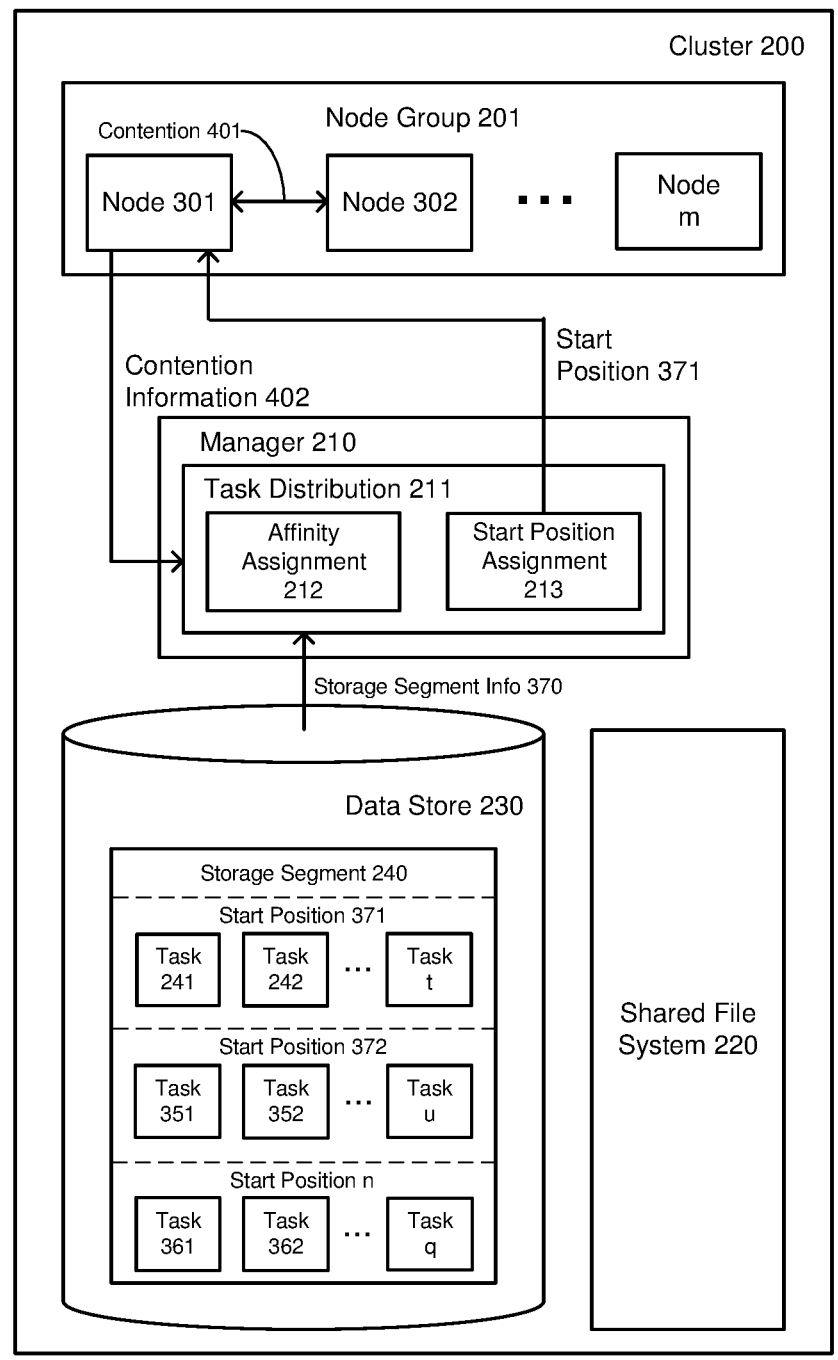
FIG. 4 illustrates example resetting of a node to its start position in response to a contention between nodes, in accordance with one or more embodiments described herein.
Figure 5:
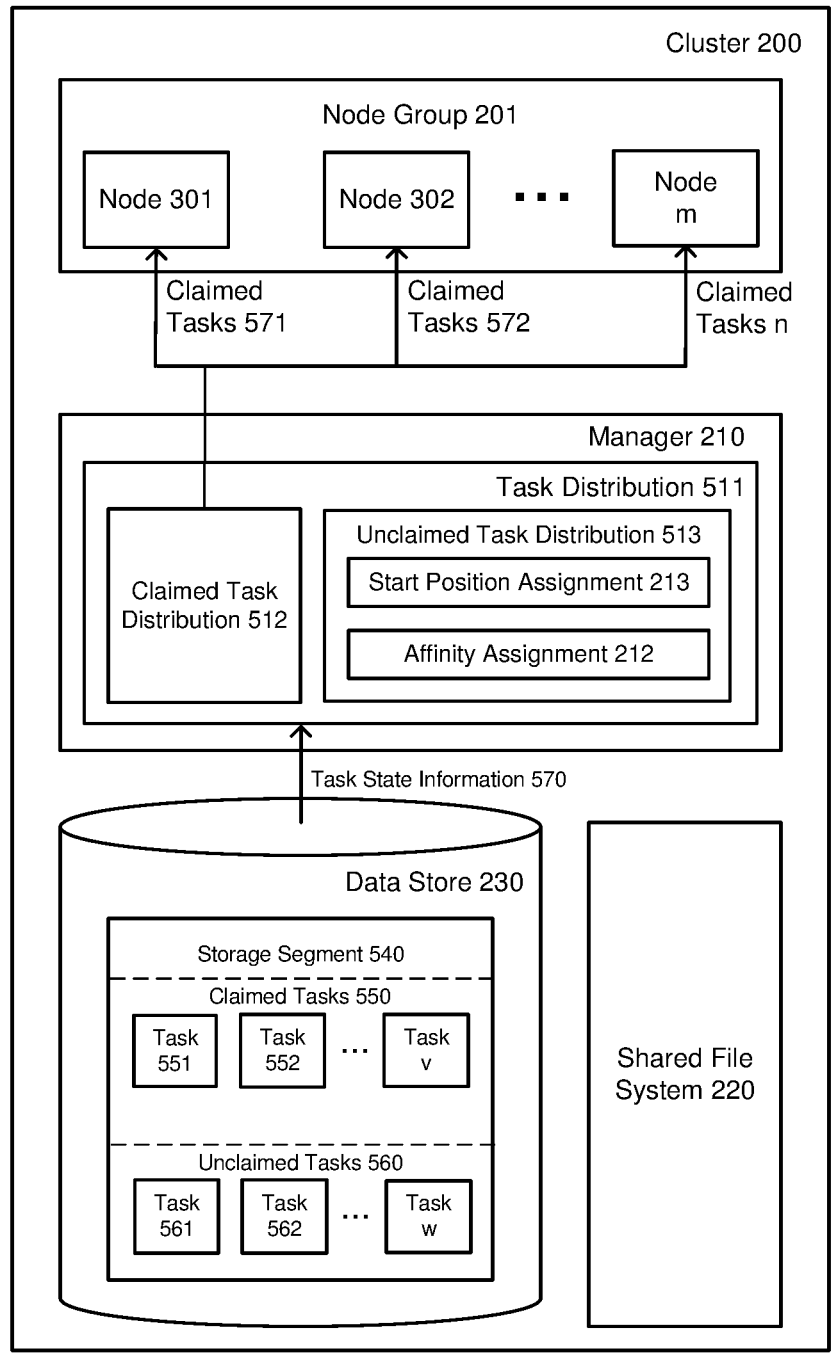
FIG. 5 illustrates example distribution of claimed and unclaimed tasks, wherein claimed tasks can be generated in a claimed state that is claimed by a node, and wherein unclaimed tasks can be distributed using affinity and start position assignments, in accordance with one or more embodiments described herein.

Embodiments of this disclosure can apply any of a variety of disclosed techniques in a cluster environment such as illustrated in FIG. 1. Each of the disclosed techniques can optionally be employed alone or in conjunction with any of the other disclosed techniques. FIG. 2 illustrates a first example technique, FIGS. 3 and 4 illustrate a second example technique, and FIG. 5 illustrates a third example technique.

FIG. 2 illustrates example assignment of different affinities to different node groups of a cluster, wherein the different affinities comprise affinities to process data movement tasks of different storage segments, in accordance with one or more embodiments described herein. FIG. 2 comprises a cluster 200, which can implement, e.g., the cluster 100 illustrated in FIG. 1. The cluster 200 comprises node groups 201, 202, . . . n, a manager 210, a shared file system 220, and a data store 230. The manager 210 comprises task distribution 211, and task distribution 211 comprises affinity assignment 212 and start position assignment 213. The data store 230 comprises storage segment 240, storage segment 250, and storage segment n, wherein storage segment 240 comprises tasks 241, 242, . . . q, storage segment 250 comprises tasks 251, 252, . . . r, and storage segment n comprises tasks 261, 262, . . . s.

In an example according to FIG. 2, affinity assignment 212 can be configured to logically separate the tasks stored in data store 230 into different logical segments, e.g., storage segments 240, 250, . . . n. The storage segment info 270 can comprise information that identifies the storage segments 240, 250, . . . n. Affinity assignment 212 can then assign different affinities 271, 272, . . . n to different node groups 201, 202, . . . n. For example, affinity 271 can be assigned to node group 201, and affinity 271 can comprise an affinity to process the tasks 241, 242, . . . q of storage segment 240. Affinity 272 can be assigned to node group 202, and affinity 272 can comprise an affinity to process the tasks 251, 252, . . . r of storage segment 250. Affinity n can be assigned to node group n, and affinity n can comprise an affinity to process the tasks 261, 262, . . . s of storage segment n.

Each of the node groups 201, 202, . . . n can comprise one or more individual nodes of the cluster 200. When an affinity, e.g., affinity 271, is assigned to a node group 201, each of the individual nodes in the node group 201 can be assigned the affinity 271. The affinity 271 can configure the nodes of the node group 201 to first attempt to process the tasks 241, 242, . . . q of the corresponding storage segment 240. When a node of the node group 201 is unable to process affinity tasks, e.g., due to a contention with another node, then the node can use a fallback procedure to take up other available tasks.

The use of storage segments 240, 250, . . . n can reduce and optionally minimize cross node storage communication, thereby improving efficiency of the data mover operation. In some embodiments, "sharding" can be used to create the storage segments 240, 250, . . . n. Sharding is a distributed database technique that splits data across multiple instances and maps specific entries (such as tasks) to a specific shard. In solutions according to this disclosure, multiple shards can be implemented on a same distributed storage backend, using shards to logically instead of physically partition the data in KVSs. These shards can be accessible to all nodes in the cluster 200.

Nodes can be given an affinity to a particular shard. In a producer-consumer usage model, the service running on a given node can prefer its local shard to pick up and produce tasks. In the general case, where there are enough tasks to go around for all nodes, each node can work on tasks within its own shard. This means that input/output (IO) updates to the shard's distributed backend storage do not contend with other nodes, since other nodes have their own separate shard affinities. From the perspective of the shared file system 220, separate entries are modified independently, rather than modifying a single entry concurrently.

During ramp up or the tail of data movement jobs, there may not be enough tasks to keep each node busy within its own shard. In this case, a node can look to its next neighbor's shard to "steal" one or more tasks therefrom. However, any work produced in connection with a "stolen" work item/task can be written to the affinity shard of the node that processed the task, not the neighbor's shard, to rebalance and reduce future necessary task stealing. This approach also provides fault tolerance because, if a node is not available to service tasks identified in its own shard, other nodes can steal tasks for themselves as needed. Likewise, if nodes are added to the cluster 200, the added nodes can be permitted to steal tasks in order to build out their own shard.

Since some operations, such as negative existence checks, may require searching all shards, solutions according to this disclosure can optionally limit the total number of shards. For example, the total number of shards can be limited to sixteen (16) shards in some embodiments. This limit strikes a balance between sharing of shards between nodes (in clusters with more than 16 nodes) and the maximum number of separate KVSs to be queried.

In another aspect, a value for a key can exist in a single shard, so any node that is given a specific key rather than searching for a work item/task will need to know which shard the key belongs to. This can be accomplished by reserving the high four bits in the key as a shard identifier. All the KVS shards taken together can be referred to herein as a single KVS for simplicity of explanation.

FIG. 3 illustrates example assignment of different start positions to different nodes in a node group, wherein the different start positions comprise different start positions within a storage segment, in accordance with one or more embodiments described herein. FIG. 3 comprises the cluster 200 introduced in FIG. 2, wherein the cluster 200 can optionally include the additional aspects introduced in FIG. 3. The cluster 200 comprises the node group 201, the manager 210, the shared file system 220, and the data store 230 introduced in FIG. 2. The node group 201 comprises example nodes 301, 302, . . . m. The data store 230 comprises the storage segment 240 illustrated in FIG. 1, wherein storage segment 240 comprises a start position 371 associated with tasks 241, 242, . . . t, a start position 372 associated with tasks 351, 352, . . . u, and a start position n associated with tasks 361, 362, . . . q.

In an example according to FIG. 3, the start position assignment 213 can be configured to determine, e.g., based on storage segment info 370, different start positions 371, 372, . . . n within a storage segment 240. The start position assignment 213 can then assign the different start positions 371, 372, . . . n to the different nodes 301, 302, . . . m in a node group 201. In FIG. 3, the start positions 371, 372, . . . n are in the storage segment 240, which can be, e.g., the storage segment 240 to which the node group 201 is assigned an affinity, e.g., the affinity 271 in FIG. 2. Nodes within other node groups, e.g., node groups 202, . . . n in FIG. 2, can be assigned start positions in other storage segments 250, . . . n.

In an aspect, operations according to FIG. 3 can partition a KVS key space associated with data store 230 to reduce the chance of contention between nodes. A core task execution loop for a job can begin by searching a task KVS for a suitable work item. Even though KVSs are sharded, there may still be contention because there may be multiple consumers within a single node. Multiple consumers searching from a key 0 to a "MAX_KEY" may be likely to find a same valid work item early in the key space and may attempt to claim the valid work item for themselves. Only one consumer can succeed, which can cause contention and a retry for the other consumer.

To address contention, searches by consumers, i.e., nodes 301, 302, . . . n of a node group 201, or searches by consumers on a single node, e.g., on node 301, can start in different start positions in the key space within a shard. Supposing two consumers A and B, consumer A can search, e.g., from key 0 to (MAX_KEY/2−1), and consumer B can search, e.g., from MAX_KEY/2 to MAX_KEY. Since consumer B leaves some of the key space unsearched, it can then start a reverse search from MAX_KEY/2 to 0 to cover the remaining space. This approach can guarantee that valid work is not missed if other consumers are unavailable or busy. To make the distribution fair, new tasks can have keys with a number of randomized high bits, which can scatter them evenly across the key space.

To minimize contention even further, a consumer can reset its search to its initial start position if a contention with another consumer occurred and a task claim attempt was unsuccessful, as illustrated further in connection with FIG. 4

FIG. 4 illustrates example resetting of a node to its start position in response to a contention between nodes, in accordance with one or more embodiments described herein. FIG. 4 comprises the cluster 200 introduced in FIG. 2 and FIG. 3, wherein the cluster 200 can optionally include the additional aspects introduced in FIG. 4. As in FIG. 3, the cluster 200 illustrated in FIG. 4 can comprise the node group 201, the manager 210, the shared file system 220, and the data store 230. The node group 201 comprises example nodes 301, 302, . . . m. The data store 230 comprises the storage segment 240 illustrated in FIG. 1, wherein storage segment 240 comprises a start position 371 associated with tasks 241, 242, . . . t, a start position 372 associated with tasks 351, 352, . . . u, and a start position n associated with tasks 361, 362, . . . q.

In an example according to FIG. 4, the nodes 301, 302, . . . m began processing tasks of a storage segment 240 according to their respective start positions 371, 372, . . . n, as described in connection with FIG. 3. However, the two nodes 301 and 302 (or alternatively two consumers A and B within a single node) nonetheless eventually experienced a contention 401, wherein the nodes 301 and 302 both attempted to process a same task. In response to the contention 401, using a contention protocol, one of the two nodes, e.g., node 301, can return to task distribution 211, optionally with contention information 402. The other node 302 involved in the contention 401 can proceed with processing the task which triggered the contention 401. The start position assignment 213 can optionally reset the returning node 301 to its initial start position 371, in response to contention 401 or contention information 402. Because tasks can be generated concurrently with processing of the tasks by the nodes, additional tasks may have been generated prior to the reset of the node 301, and so resetting the node 301 back to start position 371 can enable the node 301 to process such additional interim generated tasks. Nodes can be reset to other start positions in other embodiments.

FIG. 5 illustrates example distribution of claimed and unclaimed tasks, wherein claimed tasks can be generated in a claimed state that is claimed by a node, and wherein unclaimed tasks can be distributed using affinity and start position assignments, in accordance with one or more embodiments described herein. FIG. 5 comprises the cluster 200 introduced in FIG. 2, wherein the cluster 200 can optionally include the additional aspects introduced in FIG. 5. The cluster 200 illustrated in FIG. 5 can comprise the node group 201, the manager 210, the shared file system 220, and the data store 230. The node group 201 comprises example nodes 301, 302, . . . m. The manager 210 comprises task distribution 511, which can implement task distribution 211 in some embodiments. Task distribution 511 comprises claimed task distribution 512 and unclaimed task distribution 513. The unclaimed task distribution 513 can include the previously described start position assignment 213 and affinity assignment 212. The data store 230 comprises a storage segment 540, wherein storage segment 540 comprises claimed tasks 550 and unclaimed tasks 560. The claimed tasks 550 comprise tasks 551, 552, . . . v, and the unclaimed tasks 560 comprise tasks 561, 562, . . . w.

In an example according to FIG. 5, a first proportion or first number of tasks in the data store 230 can be generated in a claimed state. For example, the claimed tasks 550, including tasks 551, 552, . . . v can be generated in the claimed state. When a task 551, 552, . . . v is generated in a claimed state, the task 551, 552, . . . v can be claimed by a node upon generation thereof, and the node having the claim on the task can be responsible for processing the task. For example, claimed task distribution 512 can apply task state information 570 to configure node 301 to process claimed tasks 571; claimed task distribution 512 can apply task state information 570 to configure node 302 to process claimed tasks 572; and claimed task distribution 512 can apply task state information 570 to configure node m to process claimed tasks n. The claimed tasks 571 can comprise a first group of the claimed tasks 550, the claimed tasks 572 can comprise a second group of the claimed tasks 550, and the claimed tasks n can comprise a further group of the claimed tasks 550.

The unclaimed tasks 560, including tasks 561, 562, . . . w, can be generated in an unclaimed state. The unclaimed task distribution 513 can be configured to use task state information 570 to identify the unclaimed tasks 560. The unclaimed task distribution 513 can comprise affinity assignment 212 and start position assignment 213, which can operate to distribute the unclaimed tasks 560 to node groups and individual nodes of the cluster 200 as described in connection with FIGS. 2-4.

An advantage of generating a task in a claimed state is that the overhead associated with distributing the task to a node can be avoided. However, if too many tasks are generated in the claimed state, then some nodes may sit idle when their tasks are finished, and other tasks are not available for processing. Therefore, the second proportion or number of tasks can be generated in the unclaimed state, and the unclaimed tasks can be distributed by affinity assignment 212 and start position assignment 213. The proportion of claimed to unclaimed tasks can be adjusted for particular embodiments. In some embodiments, a relatively high proportion, e.g., 75% or more of the tasks, or optionally 90% or more of the tasks can be generated in an unclaimed state.

An aspect of embodiments according to FIG. 5 can comprise a reduction or minimization of cross node lock negotiation. KVSs can be backed by system B-trees (SBTs) on file systems such as "OneFS" made and used by DELL Corporation and can expose a bulk operation interface that is useful for transactions and large, uncontended writes. The operations that make up the bulk operation can be executed atomically in a single system call. Atomicity can be required for transactions, and a single system call for multiple operations can be faster when the locks necessary to complete an operation are cheap to acquire. However, when locks are expensive to acquire, due to cross node lock negotiation or heavy use, acquiring the N locks together before an operation can execute can significantly outweigh the benefit of reduced system calls. When transactions are not required and an SBT access pattern is cross-node or high-concurrency, solutions according to this disclosure need not use bulk operations. This can reduce average KVS operation latency by around 50%.

To minimize task claim contentions between different consumers, not all work need be created in equal state, as illustrated in FIG. 4. Given enough resources to execute tasks on a cluster node, solutions can generate, e.g. up to 90% or more of tasks in an "already-claimed" state, which ensures other consumers do not search and do not attempt to claim these tasks. Tasks in the "already-claimed" state can be executed immediately on the node that created them. The remaining unclaimed tasks, e.g., 10% of the tasks can be created in the "unclaimed" state, which can make the unclaimed tasks available for other nodes.

In a further aspect, embodiments of this disclosure can be configured to reduce or minimize modifications to existing data. Regardless of reduced contention, KVS operations still may be expensive in aggregate. To reduce the amount of KVS operations required for a job, solution can use per-job KVSs to avoid single-entry delete operations. Jobs can then clean up after execution. A job can have a finite duration because the description of work is finite, namely, the finite content of a dataset or difference between two datasets. Rather than placing tasks in a global KVS, each job can use its own tasks KVS. When the job is complete, a cleanup can occur by deleting the entire KVS. Cleanup can comprise a single operation for the file system 220 and need not contend with actual job execution.

Figure 6:
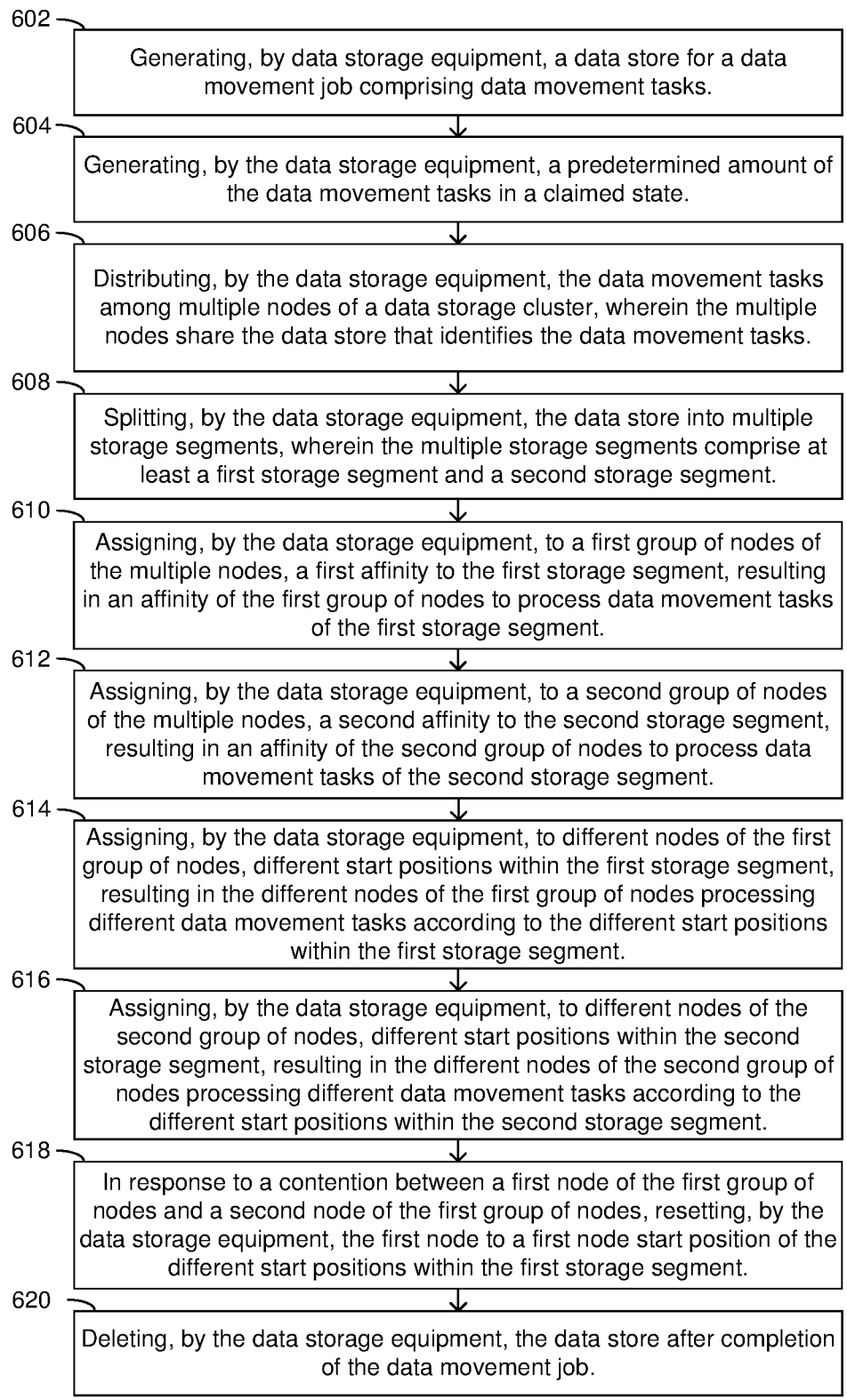
FIG. 6 is a flow diagram of a first example, non-limiting computer implemented method for distributing data movement tasks among multiple nodes of a data storage cluster, in accordance with one or more embodiments described herein.

FIG. 6 is a flow diagram of a first example, non-limiting computer implemented method for distributing data movement tasks among multiple nodes of a data storage cluster, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 6 can be performed by data storage equipment such as the cluster 200 illustrated in FIGS. 2-5. Example operation 602 comprises generating, by data storage equipment 200, a data store 230 for a data movement job comprising data movement tasks. The data store 230 can comprise, e.g., a key value store. Example operation 604 comprises generating, by the data storage equipment 200, a predetermined amount of the data movement tasks in a claimed state. As described in connection with FIG. 5, a data movement task in the claimed state, e.g., task 551, can be claimed by a node, e.g., node 301 of multiple nodes in the cluster 200.

Example operation 606 comprises distributing, by the data storage equipment 200, the data movement tasks, e.g., tasks 241, 242, . . . q, tasks 251, 252, . . . r, tasks 261, 262, . . . s among multiple nodes of a data storage cluster 200, wherein the multiple nodes share the data store 230 that identifies the data movement tasks. Operations 608-616 can optionally be performed in connection with distributing at operation 606.

Example operation 608 comprises splitting, by the data storage equipment 200, the data store 230 into multiple storage segments, e.g. storage segments 240, 250, . . . n, wherein the multiple storage segments comprise at least a first storage segment 240 and a second storage segment 250. The multiple storage segments can comprise, e.g., storage shards.

Example operation 610 comprises assigning, by the data storage equipment 200, to a first group of nodes of the multiple nodes, e.g., to node group 201, a first affinity 271 to the first storage segment 240, resulting in an affinity of the first group of nodes 201 to process data movement tasks 241, 242, . . . q of the first storage segment 240.

Example operation 612 comprises assigning, by the data storage equipment 200, to a second group of nodes of the multiple nodes, e.g., to node group 202, a second affinity 272 to the second storage segment 250, resulting in an affinity of the second group of nodes 202 to process data movement tasks 251, 252, . . . r of the second storage segment 250.

The affinities 271, 272, e.g., the affinity 271 of the first group of nodes 201 to process data movement tasks 241, 242, . . . q of the first storage segment 240, can optionally permit a node, e.g., node 301, of the first group of nodes 201 to process other data movement tasks, other than the data movement tasks 241, 242, . . . q of the first storage segment 240, in response to unavailability of the data movement tasks 241, 242, . . . q of the first storage segment 240. Such other data movement tasks can comprise tasks previously queued for processing by a neighbor node, e.g., a neighbor of node 301, wherein the neighbor node is a neighbor of the node 301 of the first group of nodes 201.

Example operation 614 comprises assigning, by the data storage equipment 200, to different nodes 301, 302, . . . m of the first group of nodes 201, different start positions 371, 372, . . . n within the first storage segment 240, resulting in the different nodes 301, 302, . . . m of the first group of nodes 201 processing different data movement tasks according to the different start positions 371, 372, . . . n within the first storage segment 240.

Example operation 616 comprises assigning, by the data storage equipment 200, to different nodes of the second group of nodes 202, different start positions within the second storage segment 250, resulting in the different nodes of the second group of nodes 202 processing different data movement tasks according to the different start positions within the second storage segment 250. Start positions in the second storage segment 250 can be determined and distributed to nodes in the second group of nodes 202 in a similar manner to distribution of start positions 371, 372, . . . n, illustrated in FIG. 3.

Example operation 618 comprises, in response to a contention 401 between a first node 301 of the first group of nodes 201 and a second node 302 of the first group of nodes 201, resetting, by the data storage equipment 200, the first node 301 to a first node start position 371 of the different start positions 371, 372, . . . n within the first storage segment 240.

Example operation 620 comprises deleting, by the data storage equipment 200, the data store 230 after completion of the data movement job. For example, the cleanup operations described herein can be performed after a data movement job is complete.

Figure 7:
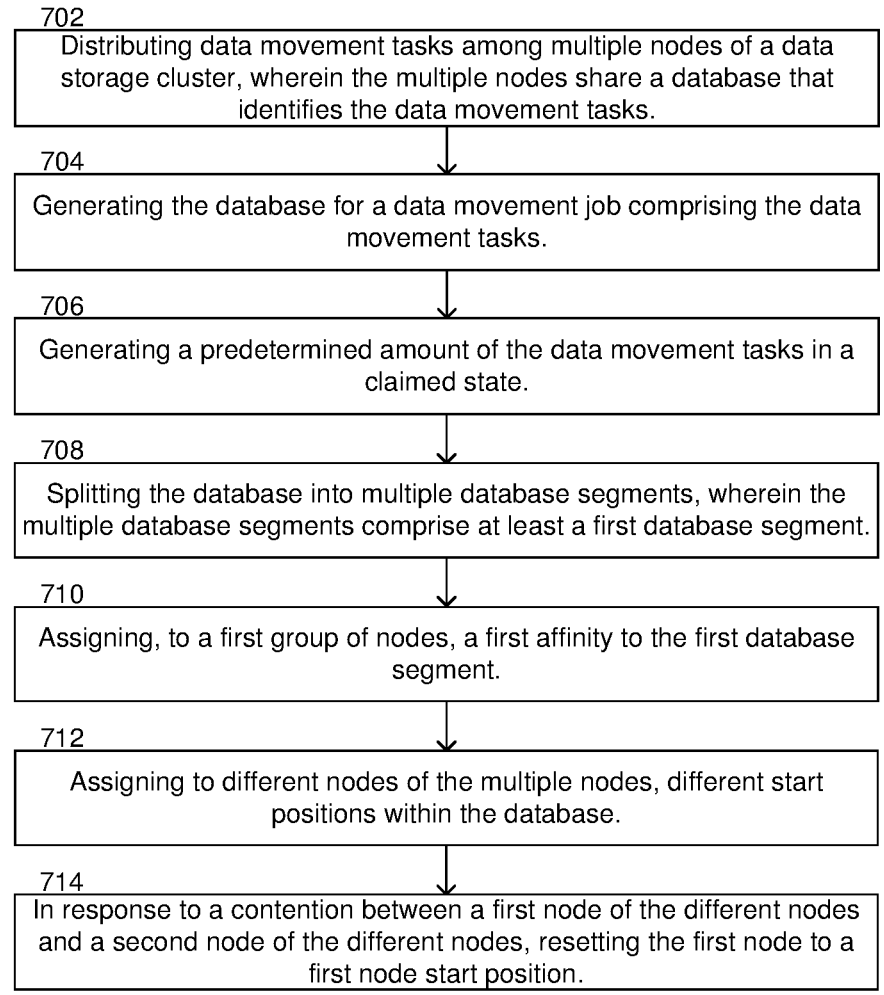
FIG. 7 is a flow diagram of a second example, non-limiting computer implemented method for distributing data movement tasks among multiple nodes of a data storage cluster, in accordance with one or more embodiments described herein.

FIG. 7 is a flow diagram of a second example, non-limiting computer implemented method for distributing data movement tasks among multiple nodes of a data storage cluster, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by data storage equipment such as the cluster 200 illustrated in FIGS. 2-5. Operation 702 comprises distributing data movement tasks, e.g., tasks 241, 242, . . . q, tasks 251, 252, . . . r, and tasks 261, 262, . . . s among multiple nodes of a data storage cluster 200, wherein the multiple nodes share a database 230 that identifies the data movement tasks. Distributing the data movement tasks pursuant to operation 702 can comprise any or all of operations 704-714 in some embodiments.

Operation 704 comprises generating the database 230 for a data movement job comprising the data movement tasks 241, 242, . . . q, 251, 252, . . . r, and 261, 262, . . . s. The database 230 can comprise a key value store which is spread across multiple nodes but which can be treated as a single database.

Operation 706 comprises generating a predetermined amount of the data movement tasks in a claimed state. A data movement task in the claimed state can be claimed by a node, e.g., node 301 of the multiple nodes in the cluster 200.

Operation 708 comprises splitting the database 230 into multiple database segments, e.g., segments 240, 250, . . . n, wherein the multiple database segments 240, 250, . . . n comprise at least a first database segment 240. The multiple database segments can comprise database shards in some embodiments.

Operation 710 comprises assigning, to a first group of nodes, a first affinity 271 to the first database segment 240, resulting in an affinity of the first group of nodes 201 to process data movement tasks 241, 242, . . . q of the first database segment 240.

Operation 712 comprises assigning to different nodes of the multiple nodes in the cluster 200, different start positions 371, 372, . . . n within the database 230, resulting in the different nodes processing different data movement tasks according to the different start positions 371, 372, . . . n within the database 230. In some embodiments, assigning different start positions 371, 372, . . . n within the database 230 can comprise assigning, to a first group of nodes 201 of the multiple nodes, different start positions 371, 372, . . . n within the first database segment 240. In other embodiments, start positions can be assigned without necessarily using segments 240, 250, . . . n and affinity assignments.

Operation 714 comprises, in response to a contention 401 between a first node 301 of the different nodes and a second node 302 of the different nodes, resetting the first node 301 to a first node start position 371 of the different start positions 371, 372, . . . n within the database 230.

Figure 8:
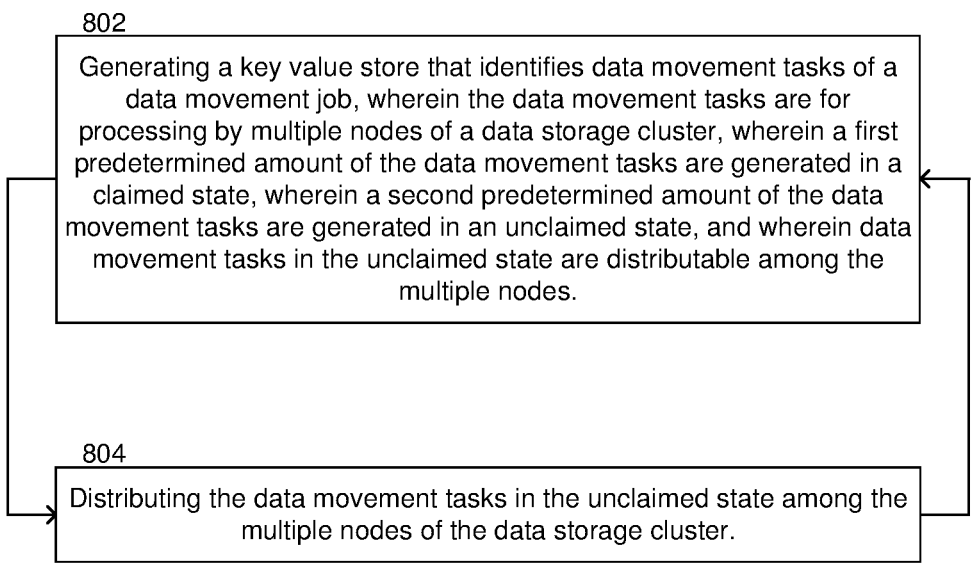
FIG. 8 is a flow diagram of a third example, non-limiting computer implemented method for distributing data movement tasks among multiple nodes of a data storage cluster, in accordance with one or more embodiments described herein.

FIG. 8 is a flow diagram of a third example, non-limiting computer implemented method for distributing data movement tasks among multiple nodes of a data storage cluster, in accordance with one or more embodiments described herein. The blocks of the illustrated method represents operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by data storage equipment such as the cluster 200 illustrated in FIGS. 2-5. FIG. 8 comprises example operations 802 and 804, with arrows to indicate that the operations can be performed in a recurring cycle. Operation 802 comprises generating a key value store, e.g., 230, that identifies data movement tasks, e.g., tasks 551, 552, . . . v and tasks 561, 562, . . . w of a data movement job, wherein the data movement tasks 551, 552, . . . v, 561, 562, . . . w are for processing by multiple nodes, e.g., nodes 301, 302, . . . m of a data storage cluster 200, wherein a first predetermined amount of the data movement tasks, i.e., the claimed tasks 550 are generated in a claimed state, wherein a second predetermined amount of the data movement tasks, i.e., the unclaimed tasks 560 are generated in an unclaimed state, and wherein data movement tasks in the unclaimed state 560 are distributable among the multiple nodes 301, 302, . . . m. As described herein, a data movement task in the claimed state is claimed by a node, e.g., node 301 of the multiple nodes 301, 302, . . . m.

Operation 804 comprises distributing the data movement tasks 561, 562, . . . w in the unclaimed state among the multiple nodes 301, 302, . . . m of the data storage cluster 200. Generating the key value store 230 pursuant to operation 802 can be performed concurrently with distributing, pursuant to operation 804, the data movement tasks 561, 562, . . . w in the unclaimed state among the multiple nodes 301, 302, . . . m of the data storage cluster 200.

Distributing the data movement tasks in the unclaimed state among the multiple nodes of the data storage cluster, pursuant to operation 804, can comprise any of the various techniques described herein, e.g., splitting the key value store 230 into different shards 240, 250, . . . n and assigning, to different groups of nodes 201, 202, . . . n, of the multiple nodes, different affinities 271, 272, . . . n to the different shards 240, 250, . . . n. Distributing the data movement tasks in the unclaimed state among the multiple nodes of the data storage cluster 200 can additionally or alternatively comprise assigning, to a first group of nodes 201 of the different groups of nodes 201, 202, . . . n, different start positions 371, 372, . . . n within a shard 240 of the different shards 240, 250, . . . n. In response to a contention 401 between a first node 301 of the first group of nodes 201 and a second node 302 of the first group of nodes 201, operations may include resetting the first node 301 to a first node start position 371 of the different start positions 371, 372, . . . n within the shard 240 of the different shards 240, 250, . . . n.

Figure 9:
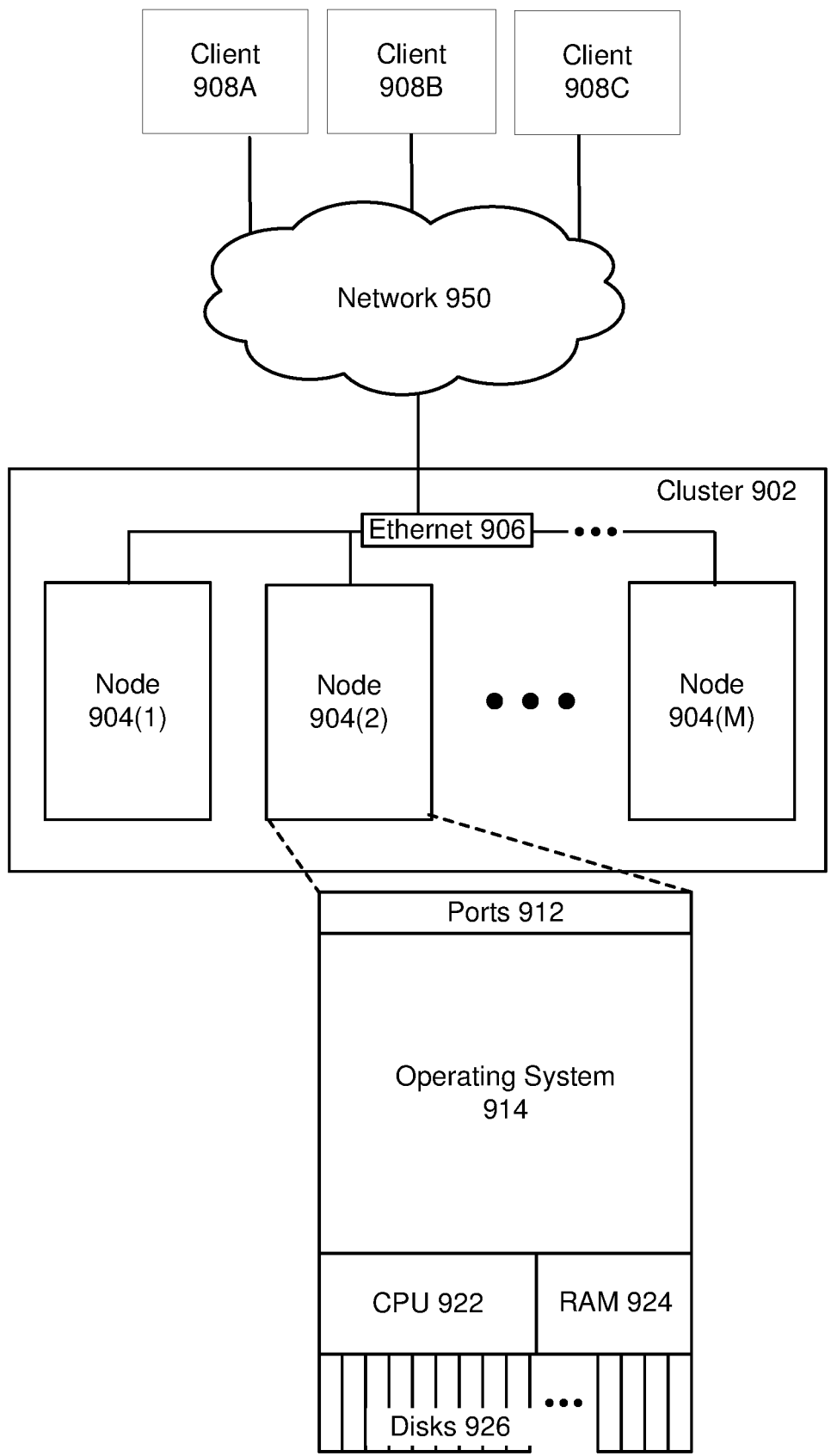
FIG. 9 illustrates an example cluster of computing devices, in accordance with one or more embodiments described herein.

FIG. 9 illustrates an example cluster of computing devices, in accordance with one or more embodiments described herein. FIG. 9 includes a cluster 902 of node devices, referred to in FIG. 9 as nodes 904(1), 904(2) . . . 904(M). Each node 904(1), 904(2) . . . 904(M) can comprise a computing device. Nodes 904(1), 904(2) . . . 904(M) can be configured to serve objects in response to requests from clients 908A, 908B, 908C. Furthermore, nodes 904(1), 904(2) . . . 904(M) can receive instructions such as remote procedure calls (RPCs) from clients 908A, 908B, 908C, and nodes 904(1), 904(2) . . . 904(M) can manipulate data stored at the cluster 902 according to the client 908A, 908B, 908C instructions. In some embodiments, one of the nodes 904(1), 904(2) . . . 904(M) can host a cluster controller virtual machine (not shown in FIG. 1), making that node the cluster controller node which administers the cluster 902. In other embodiments, the nodes 904(1), 904(2) . . . 904(M) can be peers without implementing a leader-follower architecture. The nodes 904(1), 904(2) . . . 904(M) can be coupled to each other via a suitable data communications link comprising interfaces and protocols such as, but not limited to, Ethernet block 906.

Clients 904(1), 904(2) . . . 904(M) can send requests to the cluster 902 via network 950, e.g., the Internet or any other communications network. Client communications to the cluster 902 can be configured, for example, as remote procedure calls (RPCs). An RPC can originate at a computer program within a client 908A, 908B, or 908C. The computer program uses an RPC to cause a procedure or subroutine to execute in a remote address space (e.g. at cluster 902). The RPC can be coded as if it were a normal (local) procedure call, without the programmer explicitly coding the details for the remote interaction. The cluster 902 can optionally be configured as one large object namespace. The cluster 902 can maintain an unlimited number of objects, e.g., up to trillions of objects or more. To this end, a node such as the node 904(2) can comprise ports 912 by which clients 908A, 908B, and 908C connect to the cluster 902. Example ports 912 are provided for requests via various protocols, including but not limited to TCP (transmission control protocol).

Each node, such as the node 904(2), can include an instance of an operating system 914, e.g., a OneFS® or other operating system. Each node, such as the node 904(2), can furthermore include a CPU 922, RAM 924, and storage devices such as disks 926. RAM 924 and disks 926 can comprise, e.g., volatile memory, nonvolatile memory, hard disk drives, solid-state drives or other types of memory devices. Furthermore, RAM 924 and disks 926 at multiple of the storage nodes 904(1)-904(M), as well as other storage devices attached to the cluster 902, can be used to collectively support a logical disk which provides a shared storage location for the cluster 902.

It should be emphasized that cluster deployments can be of any size. Depending on the needs of a particular organization, some clusters may comprise five or fewer nodes, while large clusters can comprise much larger numbers of nodes. The technologies disclosed herein can be included in clusters of any size, as can be appreciated.

Figure 10:
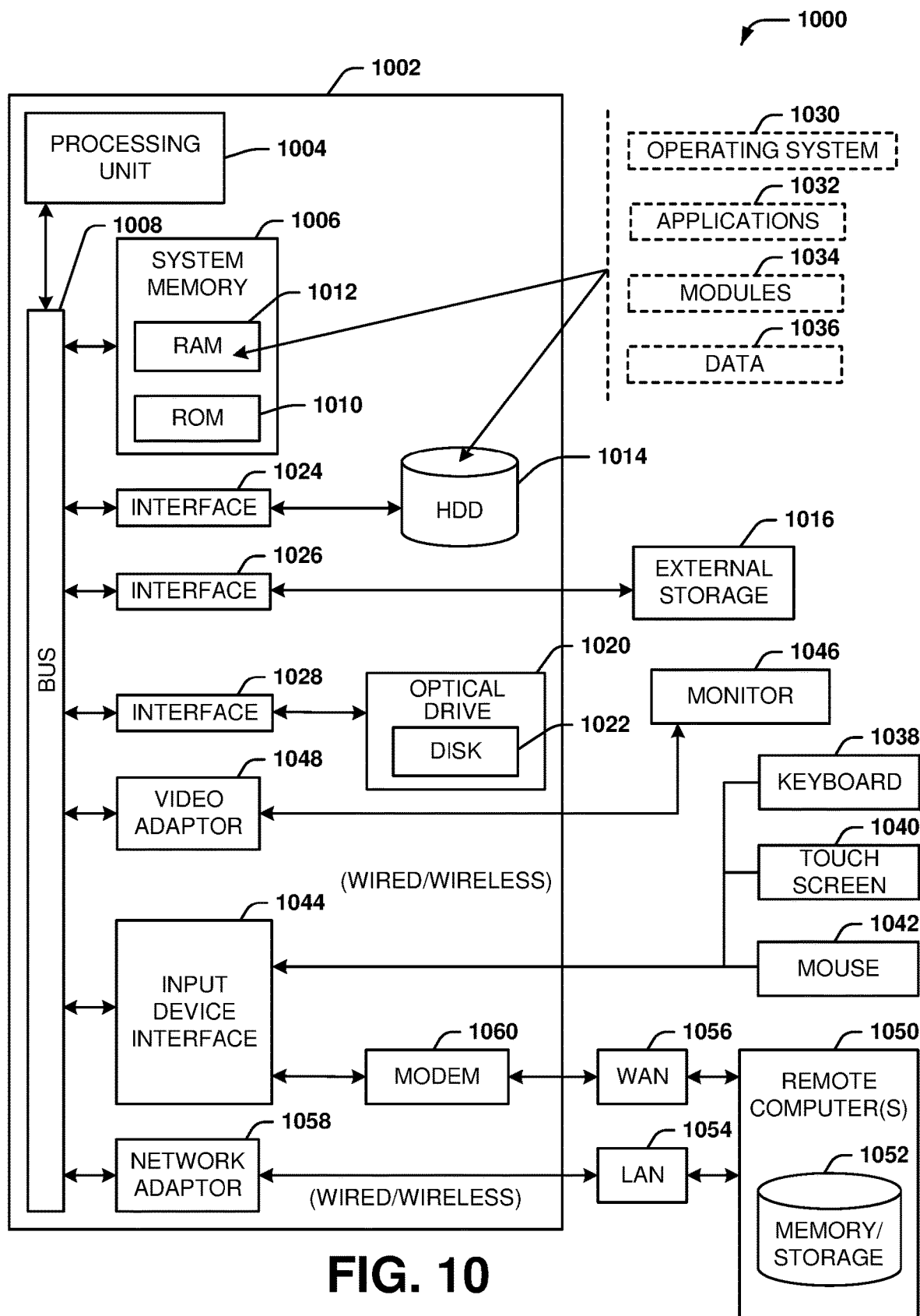
FIG. 10 illustrates a block diagram of an example computer operable to provide any of the various devices described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    distributing, by data storage equipment comprising a processor, data movement tasks among multiple nodes of a data storage cluster, wherein the multiple nodes share a data store that identifies the data movement tasks, and wherein distributing the data movement tasks comprises:
        splitting, by the data storage equipment, the data store into multiple storage segments, wherein the multiple storage segments comprise at least a first storage segment and a second storage segment;
        assigning, by the data storage equipment, to a first group of nodes of the multiple nodes, a first affinity to the first storage segment, resulting in an affinity of the first group of nodes to select first data movement tasks of the first storage segment for processing over first ones of the data movement tasks that are not part of the first storage segment;
        assigning, by the data storage equipment, to a second group of nodes of the multiple nodes, a second affinity to the second storage segment, resulting in an affinity of the second group of nodes to select second data movement tasks of the second storage segment for processing over second ones of the data movement tasks that are not part of the second storage segment;
        assigning, by the data storage equipment, to respective first nodes of the first group of nodes, different first start positions within the first storage segment to search for first unclaimed data movement tasks in the first storage segment for processing, resulting in the respective first nodes of the first group of nodes processing the first data movement tasks of the first storage segment according to the different first start positions within the first storage segment; and
        assigning, by the data storage equipment, to respective second nodes of the second group of nodes, different second start positions within the second storage segment to search for second unclaimed data movement tasks in the second storage segment for processing, resulting in the respective second nodes of the second group of nodes processing the second data movement tasks of the second storage segment according to the different second start positions within the second storage segment.

2. The method of claim 1, wherein the data store comprises a key value store.

3. The method of claim 2, further comprising generating, by the data storage equipment, the key value store for a data movement job comprising the data movement tasks, and deleting, by the data storage equipment, the key value store after completion of the data movement job.

4. The method of claim 1, wherein the multiple storage segments comprise storage shards.

5. The method of claim 1, wherein the affinity of the first group of nodes to select the first data movement tasks of the first storage segment permits a node of the first group of nodes to select one or more of the first ones of the data movement tasks that are not part of the first storage segment for processing, in response to unavailability of the first data movement tasks of the first storage segment.

6. The method of claim 5, wherein the first ones of the data movement tasks that are not part of the first storage segment comprise tasks previously queued for processing by a neighbor node, and wherein the neighbor node is a neighbor of the node of the first group of nodes.

7. The method of claim 1, further comprising, in response to a contention between a first node of the first group of nodes and a second node of the first group of nodes, resetting, by the data storage equipment, the first node to a first node start position of the different first start positions within the first storage segment.

8. The method of claim 1, further comprising generating, by the data storage equipment, a predetermined amount of the data movement tasks in a claimed state, wherein a data movement task in the claimed state is claimed by a node, of the multiple nodes, that created the data movement task in the claimed state.

9. Data storage equipment, comprising:
a processor; and
a memory that stores executable instructions that, when executed by the processor, facilitate performance of operations, comprising:
distributing data movement tasks among multiple nodes of a data storage cluster, wherein the multiple nodes share a data store that identifies the data movement tasks, and wherein distributing the data movement tasks comprises:
splitting the data store into multiple storage segments, wherein the multiple storage segments comprise at least a first storage segment and a second storage segment;
assigning, to a first group of nodes of the multiple nodes, a first affinity to the first storage segment, resulting in an affinity of the first group of nodes to select first data movement tasks of the first storage segment for processing over first ones of the data movement tasks that are not part of the first storage segment;
assigning, to a second group of nodes of the multiple nodes, a second affinity to the second storage segment, resulting in an affinity of the second group of nodes to select second data movement tasks of the second storage segment for processing over second ones of the data movement tasks that are not part of the second storage segment;
assigning, to respective first nodes of the first group of nodes, different first start positions within the first storage segment to search for first unclaimed data movement tasks in the first storage segment for processing, resulting in the respective first nodes of the first group of nodes processing the first data movement tasks of the first storage segment according to the different first start positions within the first storage segment; and
assigning, to respective second nodes of the second group of nodes, different second start positions within the second storage segment to search for second unclaimed data movement tasks in the second storage segment for processing, resulting in the respective second nodes of the second group of nodes processing the second data movement tasks of the second storage segment according to the different second start positions within the second storage segment.

10. The data storage equipment of claim 9, wherein the data store comprises a key value store.

11. The data storage equipment of claim 10, wherein the operations further comprise generating, by the data storage equipment, the key value store for a data movement job comprising the data movement tasks, and deleting, by the data storage equipment, the key value store after completion of the data movement job.

12. The data storage equipment of claim 9, wherein the multiple storage segments comprise storage shards.

13. The data storage equipment of claim 9, wherein the affinity of the first group of nodes to select the first data movement tasks of the first storage segment permits a node of the first group of nodes to select one or more of the first ones of the data movement tasks that are not part of the first storage segment for processing, in response to unavailability of the first data movement tasks of the first storage segment.

14. The data storage equipment of claim 13, wherein the first ones of the data movement tasks that are not part of the first storage segment comprise tasks previously queued for processing by a neighbor node, and wherein the neighbor node is a neighbor of the node of the first group of nodes.

15. The data storage equipment of claim 9, wherein the operations further comprise, in response to a contention between a first node of the first group of nodes and a second node of the first group of nodes, resetting, by the data storage equipment, the first node to a first node start position of the different first start positions within the first storage segment.

16. The data storage equipment of claim 9, wherein the operations further comprise generating, by the data storage equipment, a predetermined amount of the data movement tasks in a claimed state, wherein a data movement task in the claimed state is claimed by a node, of the multiple nodes, that created the data movement task in the claimed state.

17. A non-transitory machine-readable medium, comprising executable instructions that, when executed by a processor, facilitate performance of operations, comprising:
distributing data movement tasks among multiple nodes of a data storage cluster, wherein the multiple nodes share a data store that identifies the data movement tasks, and wherein distributing the data movement tasks comprises:
splitting the data store into multiple storage segments, wherein the multiple storage segments comprise at least a first storage segment and a second storage segment;
assigning, to a first group of nodes of the multiple nodes, a first affinity to the first storage segment, resulting in an affinity of the first group of nodes to select data movement tasks of the first storage segment for processing over data movement tasks that are not part of the first storage segment;
assigning, to a second group of nodes of the multiple nodes, a second affinity to the second storage segment, resulting in an affinity of the second group of nodes to select data movement tasks of the second storage segment for processing over data movement tasks that are not part of the second storage segment;
assigning, to respective nodes of the first group of nodes, different start positions within the first storage segment to search for unclaimed data movement tasks in the first storage segment for processing, resulting in the respective nodes of the first group of nodes processing different data movement tasks of the first storage segment according to the different start positions within the first storage segment; and assigning, to respective nodes of the second group of nodes, different start positions within the second storage segment to search for unclaimed data movement tasks in the second storage segment for processing, resulting in the respective nodes of the second group of nodes processing different data movement tasks of the second storage segment according to the different start positions within the second storage segment.

18. The non-transitory machine-readable medium of claim 17, wherein the data store comprises a key value store.

19. The non-transitory machine-readable medium of claim 18, wherein the operations further comprise generating the key value store for a data movement job comprising the data movement tasks, and deleting the key value store after completion of the data movement job.

20. The non-transitory machine-readable medium of claim 17, wherein the multiple storage segments comprise storage shards.

\* \* \* \* \*